US008600072B2

(12) United States Patent
Park et al.

(10) Patent No.: US 8,600,072 B2
(45) Date of Patent: Dec. 3, 2013

(54) AUDIO DATA PROCESSING APPARATUS AND METHOD TO REDUCE WIND NOISE

(75) Inventors: Jae-ha Park, Yongin-si (KR);
Hyuck-jae Lee, Seoul (KR);
Yong-choon Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1801 days.

(21) Appl. No.: 11/328,265

(22) Filed: Jan. 10, 2006

(65) Prior Publication Data

US 2006/0233391 A1    Oct. 19, 2006

(30) Foreign Application Priority Data

Apr. 19, 2005 (KR) .................. 10-2005-0032300

(51) Int. Cl.
*H04B 15/00* (2006.01)

(52) U.S. Cl.
USPC .......... 381/94.2; 381/94.1; 704/226; 704/233

(58) Field of Classification Search
USPC ........ 381/94.1, 94.3, 98, 102, 104, 94.2, 71.1
See application file for complete search history.

(56) References Cited

U.S. PATENT DOCUMENTS

| 4,965,822 A | 10/1990 | Williams |
| 5,550,925 A * | 8/1996 | Hori et al. ................... 381/98 |
| 5,568,559 A * | 10/1996 | Makino ........................ 381/98 |
| 5,701,344 A | 12/1997 | Wakui |
| 5,917,921 A | 6/1999 | Sasaki et al. |
| 6,522,751 B1 * | 2/2003 | Iwase et al. ................. 381/17 |
| 7,174,023 B2 * | 2/2007 | Ozawa ....................... 381/94.1 |
| 2004/0165736 A1 * | 8/2004 | Hetherington et al. ...... 381/94.3 |
| 2005/0238183 A1 * | 10/2005 | Ozawa ....................... 381/94.1 |
| 2006/0120540 A1 * | 6/2006 | Luo ............................... 381/98 |

FOREIGN PATENT DOCUMENTS

| JP | 4-8097 | 1/1992 |
| JP | 4-318796 | 11/1992 |
| JP | 4-322598 | 11/1992 |
| JP | 05-7392 | 1/1993 |
| JP | 05-14989 | 1/1993 |
| JP | 5-328480 | 12/1993 |
| JP | 06-269083 | 9/1994 |
| JP | 7-177597 | 7/1995 |
| JP | 10-032894 | 2/1998 |
| JP | 2004-080464 | 3/2004 |
| KR | 1993-10853 | 6/1993 |
| KR | 1995-9329 | 8/1995 |
| WO | WO 2004/019654 | 3/2004 |

OTHER PUBLICATIONS

Dutch Search Report dated Apr. 27, 2007 issued in Dutch Patent Application No. 1031581.

(Continued)

*Primary Examiner* — Disler Paul
(74) *Attorney, Agent, or Firm* — Stanzione & Kim, LLP

(57) ABSTRACT

An audio data processing apparatus and method to reduce wind noise. The apparatus includes a wind noise detecting unit to detect a wind noise section from an input audio signal, and a signal processing unit to reduce a low-frequency band signal of the input audio signal in the detected wind noise section. The apparatus determines whether wind is present and automatically reduces wind noise based on the determined result. Accordingly, the apparatus can effectively reduce wind noise.

24 Claims, 7 Drawing Sheets

(56) References Cited

OTHER PUBLICATIONS

Chinese Office Action dated Aug. 22, 2008 issued in Chinese Patent Application No. 2006100755967.

KR Office Action issued Jul. 29, 2011 in KR Patent Application No. 10-2005-0032300.

Notice of Allowability issued Nov. 18, 2011 in KR Patent Application No. 10-2005-0032300.

* cited by examiner

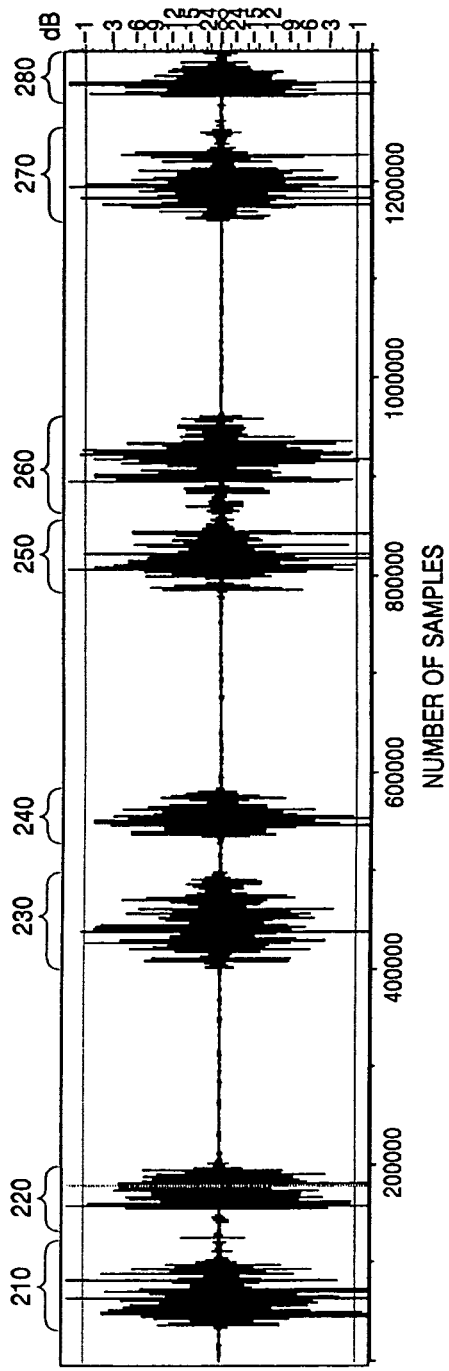

NUMBER OF SAMPLES

NUMBER OF SAMPLES

NUMBER OF SAMPLES

NUMBER OF SAMPLES

AUDIO DATA PROCESSING APPARATUS AND METHOD TO REDUCE WIND NOISE

CROSS-REFERENCE TO RELATED APPLICATIONS

This application claims the priority under 35 U.S.C. §119 of Korean Patent Application No. 2005-32300, filed on Apr. 19, 2005, in the Korean Intellectual Property Office, the disclosure of which is incorporated herein in its entirety by reference.

BACKGROUND OF THE INVENTION

1. Field of the Invention

The present general inventive concept relates to an audio data processing apparatus, and more particularly, to an audio data processing apparatus and method to reduce wind noise.

2. Description of the Related Art

Recording/reproducing apparatuses having microphones, such as camcorders, are usually used indoors, and sounds recorded outdoors are badly affected by wind. Microphones respond abnormally to wind. When sounds recorded while wind is present are reproduced, a sound of the wind included therein sounds like an explosion. A conventional apparatus for reducing wind noise based on the fact that most wind noise exists in a low-frequency band is illustrated in FIG. 1.

FIG. 1 illustrates the conventional apparatus for reducing the wind noise. An audio signal input to the apparatus through a left channel of the apparatus has two paths. A first path exists when a switch 120 is ON, and a second path exists when the switch 120 is OFF.

When the switch 120 is ON, the audio signal input to the apparatus passes through a high pass filter (HPF) 110, and a signal in a high-frequency band is output as an output signal. When the switch 120 is OFF, the audio signal input to the apparatus is output as the output signal. In FIG. 1, only the left channel of the apparatus is illustrated. However, the same configuration applies to a right channel of the apparatus.

When the wind is not present, a user may turn the switch 120 OFF to allow the input audio signal to be output unchanged. When the wind is present, the user may turn the switch 120 ON to reduce signals in the low-frequency band from the input audio signal. As a result, the input audio signal is less affected by the wind noise.

However, the biggest drawback of this method is that, when the switch 120 is ON, only high-frequency band signals are detected and reproduced from all input signals even when the wind is not present. Although the wind noise exists in the low-frequency band, if this method is used when the wind is not present, human voices or other low-frequency sounds that may be important can be reduced. Thus, an audio signal, which is not noise, may sound unpleasant.

SUMMARY OF THE INVENTION

The present general inventive concept provides an audio data processing apparatus and method, which can effectively reduce wind noise in a recording device and offer enhanced audio quality to a user.

Additional aspects and utilities of the present general inventive concept will be set forth in part in the description which follows and, in part, will be obvious from the description, or may be learned by practice of the general inventive concept.

The foregoing and/or other aspects of the present general inventive concept may be achieved by providing an audio data processing apparatus including a wind noise detecting unit to detect a wind noise section in an input audio signal, and a signal processing unit to reduce a low-frequency band signal of the input audio signal in the detected wind noise section.

The input audio signal may include a left channel input audio signal and a right channel input audio signal, and the wind noise detecting unit may detect a section of the left and right channel input audio signals in which a differential value between the left channel input audio signal and the right channel input audio signal exceeds a predetermined threshold as the wind noise section.

The low-frequency band signal may include a low-frequency band signal of the left channel input audio signal and a low-frequency band signal of the right channel input audio signal, and the signal processing unit may adjust the low-frequency band signal of the left channel input audio signal and the low-frequency band signal of the right channel input audio signal according to the differential value in the wind noise section.

The foregoing and/or other aspects of the present general inventive concept may also be achieved by providing an audio data processing apparatus including a first operator to calculate a differential value between a left channel input audio signal and a right channel input audio signal, a level adjuster to adjust a level of a low-frequency band signal of the left channel input audio signal and a level of a low-frequency band signal of the right channel input audio signal according to the calculated differential value, a second operator to add a high-frequency band signal of the left channel input audio signal to the adjusted low-frequency band signal of the left channel input audio signal, and a third operator to add a high-frequency band signal of the right channel input audio signal to the adjusted low-frequency band signal of the right channel input audio signal.

The level adjuster may adjust the level of the low-frequency band signal of the left channel input audio signal and the level of the low-frequency band signal of the right channel input audio signal according to the calculated differential value if the calculated differential value exceeds a predetermined threshold.

The foregoing and/or other aspects of the present general inventive concept may also be achieved by providing an audio data processing apparatus including a first input channel to input a first audio input signal, a second input channel to input a second audio input signal, a level detecting unit to detect a level of wind noise in the first and second audio input signals by comparing the first and second audio input signals, and a signal processing unit to process the first and second audio input signals based on the detected level of the wind noise to reduce the wind noise in the first and second audio input signals.

The foregoing and/or other aspects of the present general inventive concept may also be achieved by providing an audio data processing method including detecting a wind noise section in an input audio signal, and reducing a low-frequency band signal of the input audio signal in the detected wind noise section.

The foregoing and/or other aspects of the present general inventive concept may also be achieved by providing an audio data processing method including calculating a differential value between a left channel input audio signal and a right channel input audio signal, adjusting a level of a low-frequency band signal of the left channel input audio signal and a level of a low-frequency band signal of the right channel input audio signal according to the calculated differential value, adding a high-frequency band signal of the left channel input audio signal to the adjusted low-frequency band signal of the left channel input audio signal, and adding a high-frequency band signal of the right channel input audio signal to the adjusted low-frequency band signal of the right channel input audio signal.

The foregoing and/or other aspects of the present general inventive concept may also be achieved by providing a computer readable recording medium having executable codes to perform an audio data processing method, the method including detecting a wind noise section in an input audio signal, and reducing a low-frequency band signal of the input audio signal in the detected wind noise section.

The foregoing and/or other aspects of the present general inventive concept may also be achieved by providing a computer readable recording medium having executable codes to perform an audio data processing method, the method including calculating a differential value between a left channel input audio signal and a right channel input audio signal, adjusting a level of a low-frequency band signal of the left channel input audio signal and a level of a low-frequency band signal of the right channel input audio signal according to the calculated differential value, adding a high-frequency band signal of the left channel input audio signal to the adjusted low-frequency band signal of the left channel input audio signal, and adding a high-frequency band signal of the right channel input audio signal to the adjusted low-frequency band signal of the right channel input audio signal.

BRIEF DESCRIPTION OF THE DRAWINGS

These and/or other aspects of the present general inventive concept will become apparent and more readily appreciated from the following description of the embodiments, taken in conjunction with the accompanying drawings of which:

FIG. 2C is a graph illustrating a signal obtained as a result of subtracting the right channel input audio signal from the left channel input audio signal;

DETAILED DESCRIPTION OF THE PREFERRED EMBODIMENTS

Figure 1:
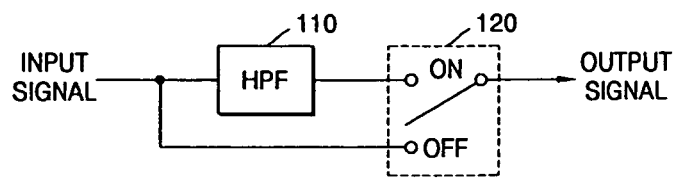
FIG. 1 is a view illustrating a conventional apparatus for reducing wind noise.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2A:
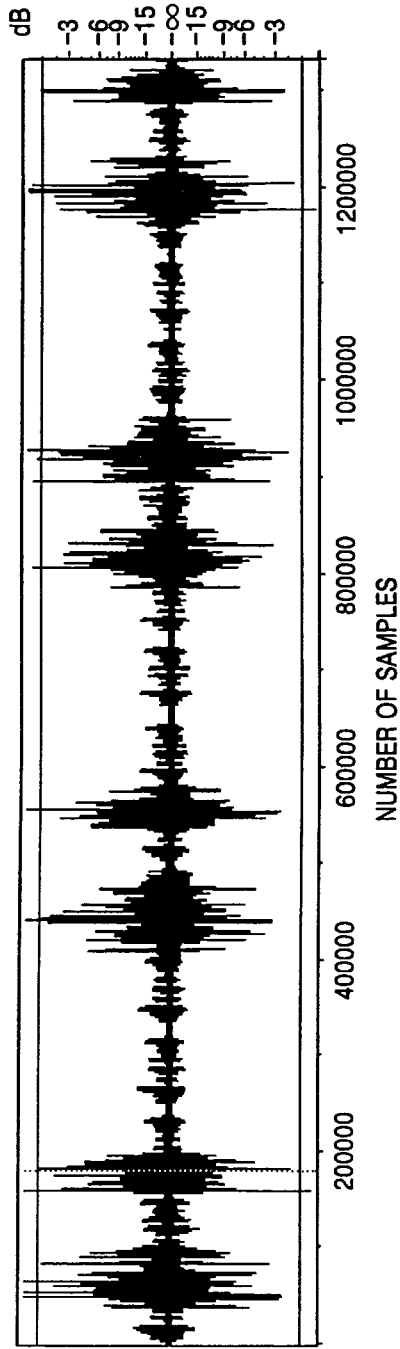
FIGS. 2A and 2B are graphs respectively illustrating a left channel input audio signal and a right channel input audio signal, both having wind noise.
Figure 2B:
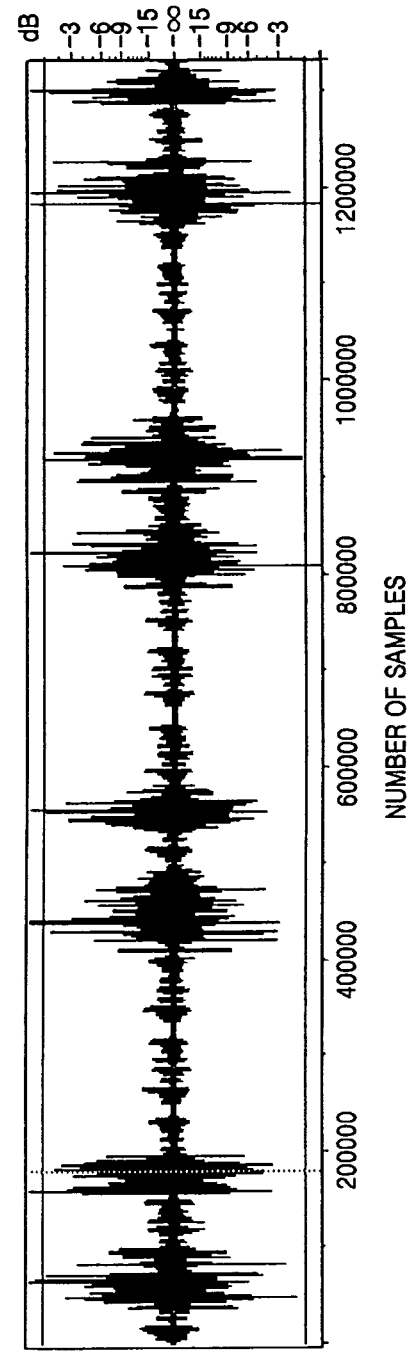

FIGS. 2A and 2B are graphs respectively illustrating an audio signal having wind noise and input to an audio data processing apparatus to reduce wind noise through a left channel of the apparatus (hereinafter, called a left channel input audio signal) and an audio signal having wind noise and input to the apparatus through a right channel of the apparatus (hereinafter, called a right channel input audio signal). In each of FIGS. 2A and 2B, a horizontal axis indicates a number of samples of the audio signal and a vertical axis indicates a magnitude (dB) of the audio signal.

Referring to FIGS. 2A and 2B, overall shapes of the left channel input audio signal and the right channel input audio signal are not much different. However, the wind noise input through the left and right channels is different. Accordingly, if the right channel input audio signal illustrated in FIG. 2B is subtracted from the left channel input audio signal illustrated in FIG. 2A, resulting signals 210, 220, 230, 240, 250, 260, 270, and 280 indicating wind noise remain, as illustrated in FIG. 2C.

Therefore, if the right channel input audio signal is subtracted from the left channel input audio signal or if the left channel input audio signal is subtracted from the right channel input audio signal, sections in which the wind noise is present can be detected. In such sections, if a process of reducing the wind noise is performed, the wind noise can be effectively reduced from the right and left channel input audio signals.

Figure 3:
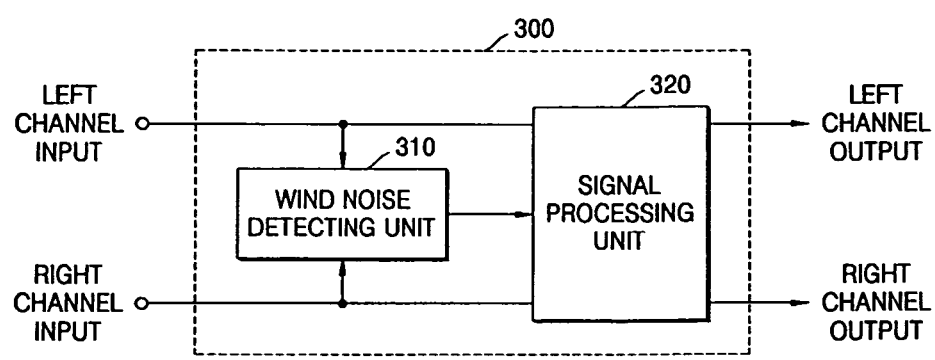
FIG. 3 is a block diagram illustrating an audio data processing apparatus to reduce wind noise according to an embodiment of the present general inventive concept.

FIG. 3 is a block diagram illustrating an audio data processing apparatus 300 to reduce wind noise according to an embodiment of the present general inventive concept. Referring to FIG. 3, the apparatus 300 includes a wind noise detecting unit 310 and a signal processing unit 320.

The wind noise detecting unit 310 detects sections of input audio signals in which the wind noise exists using a left channel input audio signal and a right channel input audio signal received through a left channel input terminal and a right channel input terminal, respectively, and transmits information regarding the detected sections in which the wind noise exists to the signal processing unit 320.

The signal processing unit 320 receives the information regarding the detected sections, performs signal processing to reduce the wind noise only on the detected sections of the left channel input audio signal and the right channel input audio signal in which the wind noise is present, and outputs a result of the signal processing to left and right channel outputs. That is, the signal processing unit 320 processes the sections of the left channel input audio signal in which the wind noise is determined to be present and outputs the processed left channel input audio signal to the left channel output, and processes the sections of the right channel input audio signal in which the wind noise is determined to be present and outputs the processed right channel input audio signal to the right channel output.

Figure 4:
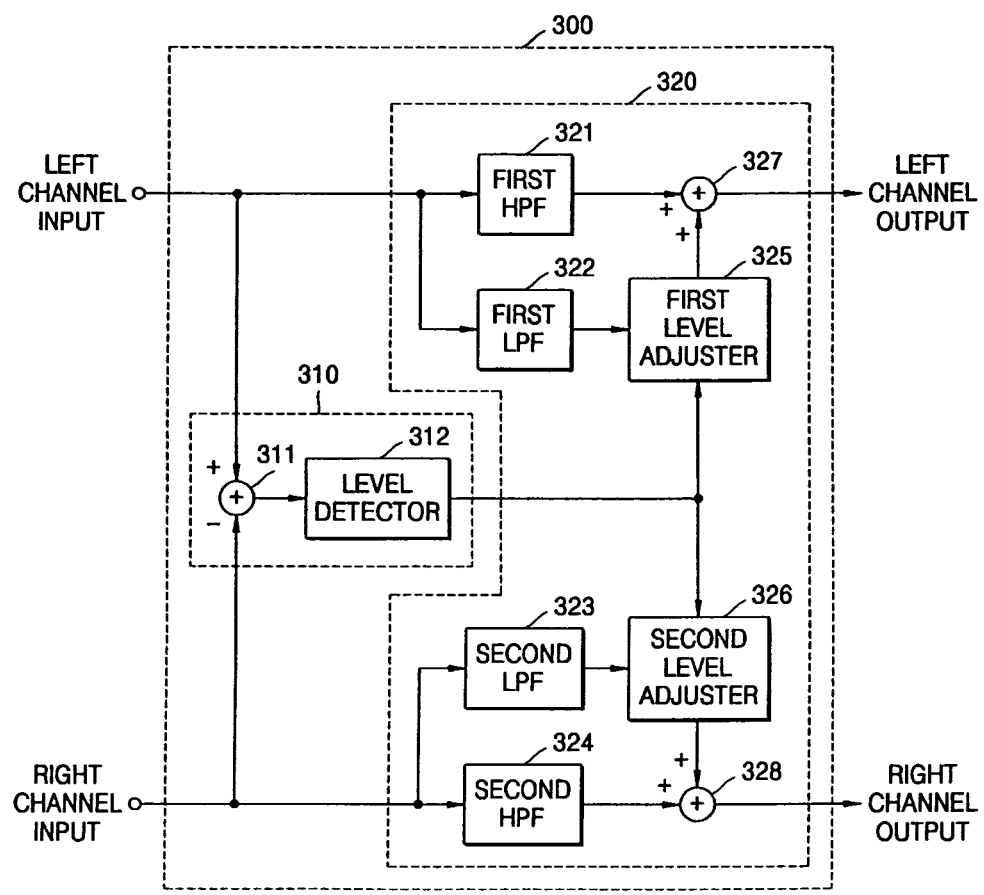
FIG. 4 is a detailed block diagram illustrating the audio data processing apparatus of FIG. 3.

FIG. 4 is a detailed block diagram illustrating the audio data processing apparatus 300 of FIG. 3. Referring to FIG. 4, the wind noise detecting unit 310 includes a first operator 311 and a level detector 312.

Two signals respectively input to two channels of the apparatus 300 using two microphones are recognized as input signals, and for the sake of convenience, one channel is referred to as the left channel input, and the other channel is referred to as the right channel input.

The first operator 311 subtracts the right channel input audio signal from the left channel input audio signal and transmits a resulting signal to the level detector 312. As described above with reference to FIGS. 2A through 2C, when wind is present, the wind noise in the left channel and the wind noise in the right channel are different. Therefore, if the right channel input audio signal input from the right channel is subtracted from the left channel input audio signal input from the left channel, only wind noise components are left in the resulting signal.

As illustrated in FIG. 4, the first operator 311 subtracts the right channel input audio signal from the left channel input audio signal. However, the first operator 311 may also subtract the left channel input audio signal from the right channel input audio signal. It is also sufficient for the first operator 311 to calculate a differential value between the left channel input audio signal and the right channel input audio signal.

The level detector 312 receives the resulting signal from the first operator 311, determines an intensity of the wind based on attribute information of the resulting signal, and calculates a gain of a signal to be output from the level detector 312 based on the determined intensity of the wind. If the determined intensity of the wind is high, the signal gain may be adjusted for a large reduction of signals in a low-frequency band. If the determined intensity of the wind is weak, the gain of the signal to be output may be adjusted for a small reduction of signals in the low-frequency band.

A method of adjusting the size of the gain to be multiplied by a low-frequency band signal according to the intensity of the wind using the level detector 312 will now be described. The level detector 312 determines whether a value obtained by subtracting the right channel input audio signal from the left channel input audio signal exceeds a predetermined threshold. If the value exceeds the predetermined threshold, the level detector 312 determines that the left and right channel input audio signals contain a wind noise signal component. If the subtracted value does not exceed the predetermined threshold, the level detector 312 determines that the left and right channel input audio signals do not contain the wind noise signal component.

If the level detector 312 determines that the left and right channel input audio signals contain the wind noise signal component, the level detector 312 outputs a predetermined gain value to reduce the wind noise from the left and right channel input audio signals. If the level detector 312 determines that the left and right channel input audio signals do not contain the wind noise signal component, the level detector 312 outputs a predetermined gain value not to reduce the wind noise from the left and right channel input audio signals. For example, if the level detector 312 determines that the left and right channel input audio signals do not contain the wind noise signal component, the level detector 312 may output "1." If the level detector 312 determines that the left and right channel input audio signals contain the wind noise signal component, the level detector 312 may output a predetermined gain value greater than or equal to 0 and smaller than 1, which corresponds to the difference between the left channel input audio signal and the right channel input audio signal. The predetermined gain value which corresponds to the difference between the left channel input audio signal and the right channel input audio signal may approach 0 when the difference value increases and may approach 1 as the difference value decreases.

The signal processing unit 320 includes a first high pass filter (HPF) 321, a first low pass filter (LPF) 322, a second LPF 323, a second HPF 324, a first level adjuster 325, a second level adjuster 326, a second operator 327, and a third operator 328.

The left channel input audio signal is divided into one or more frequency components, for example, a high-frequency component and a low-frequency component, by the first HPF 321 and the first LPF 322, respectively. In other words, the first HPF 321 detects a high-frequency band signal from the left channel input audio signal and outputs the detected high-frequency band signal to the second operator 327. The first LPF 322 detects a low-frequency band signal from the left channel input audio signal and outputs the detected low-frequency band signal to the first level adjuster 325.

The first level adjuster 325 multiplies the received low-frequency band signal by the gain value output from the level detector 312 and outputs the multiplication result to the second operator 327. For example, if the level detector 312 determines that the left and right channel input audio signals do not contain the wind noise signal component and outputs "1," the first level adjuster 325 multiplies the received low-frequency band signal by "1." Hence, the received low-frequency band signal remains unchanged as if the received low-frequency band signal is not processed.

If the level detector 312 determines that the left and right channel input audio signals do contain the wind noise signal component and outputs "0.5," the first level adjuster 325 multiplies the received low-frequency band signal by "0.5." Hence, the magnitude of the low-frequency signal is reduced by 0.5. Accordingly, when the wind noise sections are detected by the wind noise detecting unit 310, the low-frequency band signal having the wind noise can be automatically reduced. Thus, unpleasant sounds caused by the wind noise can be minimized and, when the wind is not present, signals in all frequency bands can be recorded.

The second operator 327 adds the high-frequency band signal received from the first HPF 321 to the multiplication result received from the first level adjuster 325 and outputs the addition result to the left channel output. The signal processing of the left channel, as described above, is applied similarly to the right channel input audio signal.

The right channel input audio signal is divided into one or more frequency components, for example, a high-frequency component and a low-frequency component, by the second HPF 324 and the second LPF 323, respectively. The second HPF 324 detects a high-frequency band signal from the right channel input audio signal and outputs the detected high-frequency band signal to the third operator 328. The second LPF 323 detects a low-frequency band signal from the right channel input audio signal and outputs the detected low-frequency band signal to the second level adjuster 326.

The second level adjuster 326 multiplies the received low-frequency band signal by the gain value output from the level detector 312 and outputs the multiplication result to the third operator 328. For example, if the level detector 312 determines that the left and right channel input audio signals do not contain the wind noise signal component and outputs "1," the second level adjuster 326 multiplies the received low-frequency band signal by "1." Hence, the received low-frequency band signal remains unchanged as if the received low-frequency band signal is not processed.

If the level detector 312 determines that the left and right channel input audio signals contain the wind noise signal component and outputs "0.5," the second level adjuster 326 multiplies the received low-frequency band signal by "0.5." Hence, the magnitude of the low-frequency signal is reduced by 0.5.

The third operator 328 adds the high-frequency band signal received from the second HPF 324 to the multiplication result received from the second level adjuster 326 and outputs the addition result to the right channel output.

Figure 5:
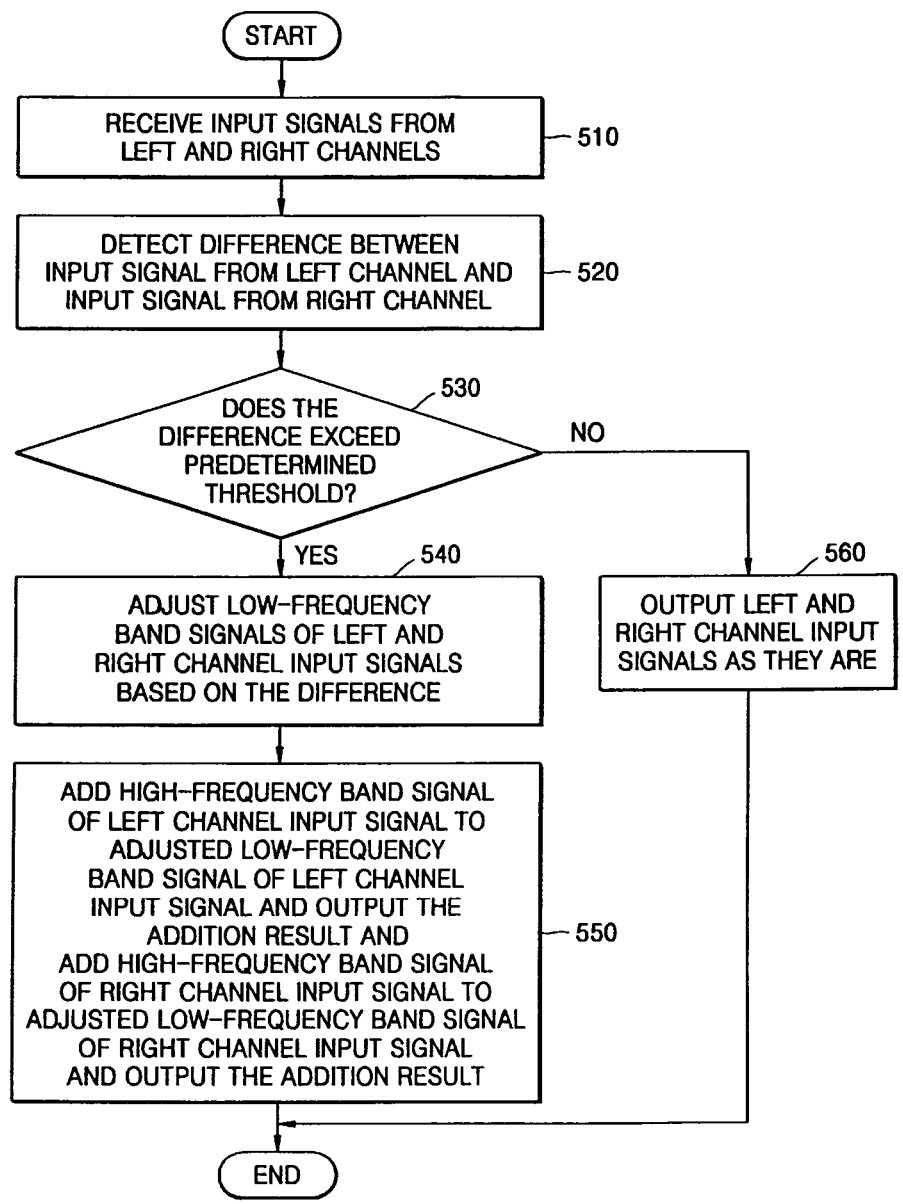
FIG. 5 is a flowchart illustrating a method of reducing wind noise according to an embodiment of the present general inventive concept.

FIG. 5 is a flowchart illustrating a method of reducing wind noise according to an embodiment of the present general inventive concept. Referring to FIG. 5, input audio signals are received from right and left channels, respectively (operation 510).

A difference between the input audio signal from the left channel and the input audio signal from the right channel is detected (operation 520), and the detected difference represents the wind noise.

It is then determined whether the detected difference exceeds a predetermined threshold (operation 530). If the difference exceeds the predetermined threshold, low-frequency band signals of the left channel input audio signal and the right channel input audio signal are adjusted based on the detected difference (operation 540).

A high-frequency band signal of the left channel input audio signal is added to the adjusted low-frequency band signal of the left channel input audio signal and the addition result is output to a left channel output. A high-frequency band signal of the right channel input audio signal is added to the adjusted low-frequency band signal of the right channel input audio signal and the addition result is output to a right channel output (operation 550).

If the difference does not exceed the predetermined threshold at operation 530, the low-frequency band signals of the left and right channel input audio signals are not adjusted. Instead, the audio signal input from the right channel is output to the right channel output unchanged and the audio signal input from the left channel is output unchanged to the left channel output (operation 560).

In the method illustrated in FIG. 5, only when the difference between the left channel input audio signal and the right channel input audio signal, i.e., a wind component, exceeds the predetermined threshold, are the respective low-frequency band signals of the right channel input audio signal and the left channel input audio signal adjusted. However, the present general inventive concept is not limited to this case. In other words, even when the difference does not exceed the predetermined threshold, that is, even when the wind component is very small, the low-frequency band signals of the left and right channel input audio signals may be adjusted.

Figure 6A:
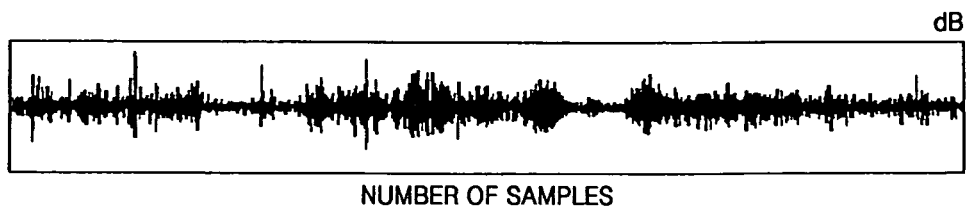
FIGS. 6A and 6B are graphs respectively illustrating a left channel input audio signal and a right channel input audio signal, both having wind noise.
Figure 6B:
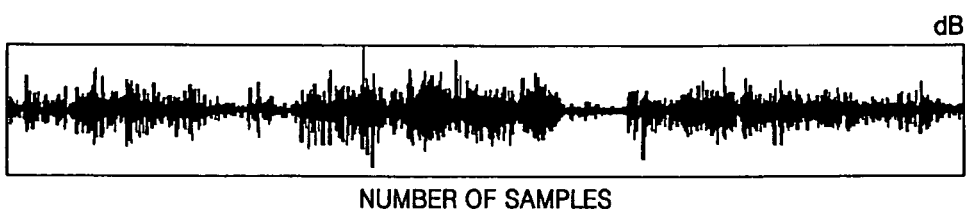
Figure 7A:
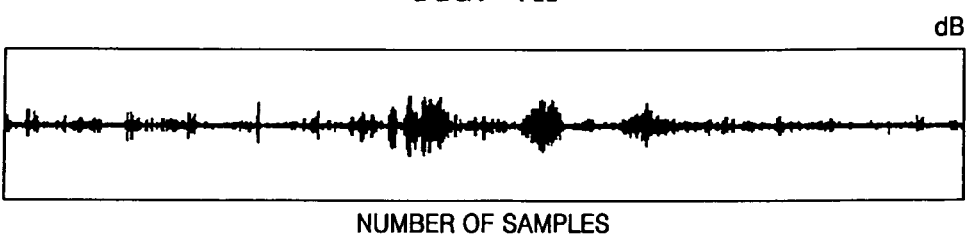
FIGS. 7A and 7B are graphs illustrating the left channel input audio signal and the right channel input audio signal processed and output using the method of reducing the wind noise of FIG. 5.
Figure 7B:
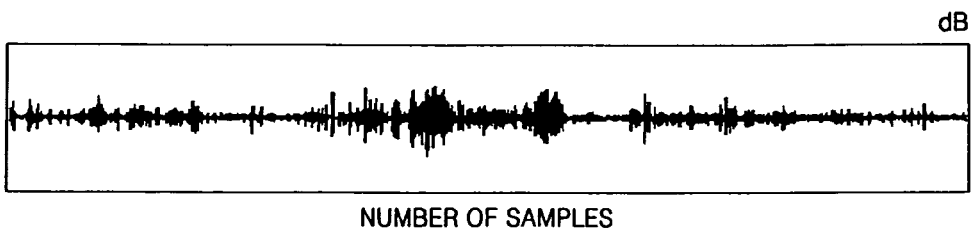

FIGS. 6A and 6B are graphs respectively illustrating a left channel input audio signal and a right channel input audio signal, both having wind noise. FIGS. 7A and 7B are graphs respectively illustrating the left channel input audio signal and the right channel input audio signal of FIGS. 6A and 6B processed and output using the method of reducing wind noise of FIG. 5. It can be seen from the graphs of FIGS. 7A and 7B that the wind noise included in the left channel input audio signal and the right channel input audio signal is greatly reduced.

It is possible for the present general inventive concept to be realized on a computer-readable recording medium as a computer-readable code. Computer-readable recording mediums include many types of recording devices that store computer system-readable data. ROMs, RAMS, CD-ROMs, magnetic tapes, floppy discs, optical data storage, etc. are used as computer-readable recording mediums.

As described above, an audio data processing apparatus according to an embodiment of the present general inventive concept determines whether wind is present and automatically reduces wind noise in an input signal according to the result of the determination. In addition, the audio data processing apparatus automatically reduces the wind noise according to an intensity of the wind, thereby considerably enhancing audio quality.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An audio data processing apparatus comprising:
a wind noise detecting unit to detect a wind noise section in an input audio signal by comparing unfiltered left and right channel signals of the input audio signal and generating a signal corresponding to a difference between the unfiltered left and right channel signals, and to generate information on the detected wind noise section according to the generated signal, the information including a gain; and
a signal processing unit to reduce at least one low-frequency band signal of the input audio signal in the detected wind noise section by separating the at least one low-frequency band signal and the remaining frequency band of the input audio signal, multiplying the at least one low-frequency band signal by the gain, and merging the at least one low-frequency band signal with the remaining frequency band of the input audio signal.

2. The apparatus of claim 1, wherein the wind noise detecting unit detects a section of the left and right channel signals as the wind noise section when a differential value between the left channel signal and the right channel signal according to the generated signal exceeds a predetermined threshold.

3. The apparatus of claim 2, wherein the at least one low frequency band signal comprises a low-frequency band signal of the left channel signal and a low-frequency band signal of the right channel signal, and the signal processing unit adjusts the low-frequency band signal of the left channel signal and the low-frequency band signal of the right channel signal according to the differential value in the wind noise section.

4. An audio data processing apparatus comprising:
a first operator to calculate a differential value of an unfiltered signal corresponding to a difference between a left channel input audio signal and a right channel input audio signal;
a first level adjuster to adjust a level of a low-frequency band signal of the left channel input audio signal according to the calculated differential value and a second level adjuster to adjust a level of a low-frequency band signal of the right channel input audio signal according to the calculated differential value;
a second operator to add a high-frequency band signal of the left channel input audio signal to the adjusted low-frequency band signal of the left channel input audio signal; and
a third operator to add a high-frequency band signal of the right channel input audio signal to the adjusted low-frequency band signal of the right channel input audio signal.

5. The apparatus of claim 4, wherein the first and second level adjusters respectively adjust the level of the low-frequency band signal of the left channel input audio signal and the level of the low-frequency band signal of the right channel input audio signal according to the calculated differential value if the calculated differential value exceeds a predetermined threshold.

6. An audio data processing apparatus comprising:
a first input channel to input a first audio input signal;
a second input channel to input a second audio input signal;
a level detecting unit to detect a level of wind noise in the first and second audio input signals by comparing the first and second audio input signals before filtering and by generating a signal corresponding to a difference between the first and second audio input signals, and to generate wind noise information on the detected wind noise level, the wind noise information including a gain; and a signal processing unit to process the first and second audio input signals to reduce the wind noise in the first and second audio input signals by separating at least one low-frequency band signal from the remaining frequency band of each of the first and second audio input signals, multiplying the at least one low-frequency band signal of each of the first and second audio input signals by the gain, and merging the low-frequency band signals with remaining frequency band of each corresponding audio input signal.

7. The apparatus of claim 6, wherein:
the first audio input signal comprises one or more first frequency band signals;
the second audio input signal comprises one or more second frequency band signals; and
the signal processing unit adjusts at least one of the one or more first frequency band signals and at least one of the one or more second frequency band signals.

8. The apparatus of claim 7, wherein:
the one or more first frequency band signals comprise high and low frequency band signals;
the one or more second frequency band signals comprise high and low frequency band signals; and
the signal processing unit adjusts the low frequency band signals.

9. The apparatus of claim 6, wherein the signal processing unit adjusts a magnitude of low frequency portions of the first and second input audio signals based on the detected level of the wind noise when the detected level of the wind noise is greater than a predetermined value, and outputs the first and second input audio signals unchanged when the detected level of the wind noise is not greater than the predetermined value.

10. The apparatus of claim 6, wherein the level detecting unit comprises:
an operator to subtract one of the first and second audio input signals from the other one thereof to detect a noise signal; and
a level detector to detect an amplitude of the noise signal and to output a gain value according to the detected amplitude of the noise signal.

11. The apparatus of claim 10, wherein the level detector determines the gain value to be one when the amplitude of the noise signal is less than a predetermined value, and determines the gain value to be less than one and greater than or equal to zero when the amplitude of the noise is greater than or equal to the predetermined value.

12. The apparatus of claim 11, wherein the level detector decreases the gain when the amplitude of the noise signal increases.

13. An audio data processing apparatus comprising:
a first input channel to input a first audio input signal;
a second input channel to input a second audio input signal;
a level detecting unit to detect a level of wind noise in the first and second audio input signals by comparing the first and second audio input signals before filtering and by generating a signal corresponding to a difference between the first and second audio input signals, and to generate wind noise information on the detected wind noise level; and
a signal processing unit to process the first and second audio input signals based on the wind noise information to reduce the wind noise in the first and second audio input signals, the signal processing unit comprising:

a first high pass filter to extract a first high frequency band of the first input audio signal;
a second high pass filter to extract a second high frequency band of the second input audio signal;
a first low pass filter to extract a first low frequency band of the first input audio signal;
a second low pass filter to extract a second low frequency band of the second input audio signal;
a first level adjuster to adjust a level of the first low frequency band based on the detected level of the wind noise;
a second level adjuster to adjust a level of the second low frequency band based on the detected level of the wind noise;
a first operator to combine the extracted first high frequency band and the adjusted first low frequency band; and
a second operator to combine the extracted second high frequency band and the adjusted second low frequency band.

14. An audio data processing apparatus comprising:
a first input channel to input a first audio input signal;
a second input channel to input a second audio input signal;
a level detecting unit to detect a level of wind noise in the first and second audio input signals by comparing the first and second audio input signals before filtering and by generating a signal corresponding to a difference between the first and second audio input signals, and to generate wind noise information on the detected wind noise level, the level detecting unit comprising: an operator to subtract one of the first and second audio input signals from the other one thereof to detect a noise signal; and a level detector to detect an amplitude of the noise signal and to output a gain value according to the detected amplitude of the noise signal, the level detector determining the gain value to be one when the amplitude of the noise signal is less than a predetermined value and determining the gain value to be less than one and greater than or equal to zero when the amplitude of the noise is greater than or equal to the predetermined value; and
a signal processing unit to process the first and second audio input signals based on the wind noise information to reduce the wind noise in the first and second audio input signals, the signal processing unit multiplying low frequency portions of the first and second input signals by the gain to reduce the wind noise in the first and second audio input signals.

15. An audio data processing method comprising:
detecting a wind noise section in an input audio signal by comparing unfiltered left and right channel signals of the input audio signal and generating a signal corresponding to a difference between the unfiltered left and right channel signals of the input audio signal;
determining a gain based on the signal corresponding to the difference; and
reducing a low-frequency band signal of the input audio signal in the detected wind noise section by separating the at least one low-frequency band signal and the remaining frequency band of the input audio signal, multiplying the at least one low-frequency band signal by the gain, and merging the at least one low-frequency band signal with the remaining frequency band of the input audio signal.

16. The method of claim 15, wherein the detecting of the wind noise section in the input audio signal comprises:

detecting a section as the wind noise section when a differential value of the signal between the left channel signal and the right channel signal exceeds a predetermined threshold.

17. The method of claim 16, wherein the reducing of the low-frequency band signal of the input audio signal in the detected wind noise section comprises:
adjusting a low-frequency band signal of the left channel signal and a low-frequency band signal of the right channel signal according to the differential value in the wind noise section.

18. An audio data processing method comprising:
calculating a differential value of an unfiltered signal corresponding to a difference between a left channel input audio signal and a right channel input audio signal;
adjusting a level of a low-frequency band signal of the left channel input audio signal and a level of a low-frequency band signal of the right channel input audio signal according to the calculated differential value;
adding a high-frequency band signal of the left channel input audio signal to the adjusted low-frequency band signal of the left channel input audio signal; and
adding a high-frequency band signal of the right channel input audio signal to the adjusted low-frequency band signal of the right channel input audio signal.

19. The method of claim 18, wherein the adjusting of the level of the low-frequency band signal of the left channel input audio signal and the level of the low-frequency band signal of the right channel input audio signal according to the calculated differential value comprises:
adjusting the level of the low-frequency band signal of the left channel input audio signal and the level of the low-frequency band signal of the right channel input audio signal according to the calculated differential value if the calculated differential value exceeds a predetermined threshold.

20. The method of claim 18, wherein the adjusting of the level of the low-frequency band signal of the left channel input audio signal and the level of the low-frequency band signal of the right channel input audio signal according to the calculated differential value comprises:
setting a gain value based on the calculated differential value;
multiplying the low-frequency band signal of the left channel input audio signal by the gain value; and
multiplying the low-frequency band signal of the right channel input audio signal by the gain value.

21. The method of claim 20, wherein the setting of the gain value comprises:
setting the gain value to be greater than or equal to zero and less than one when the calculated differential value is not greater than a predetermine value; and
setting the gain value to be one when the calculated differential value is greater than the predetermined value.

22. The method of claim 20, wherein the setting of the gain value comprises:
decreasing the gain value when the calculated differential value increases.

23. A non-transitory computer readable medium having executable codes to perform an audio data processing method, the method comprising:
detecting a wind noise section in an input audio signal by comparing unfiltered left and right channel signals of the input audio signal and generating a signal corresponding to a difference between the unfiltered left and right channel signals of the input audio signal;
determining a gain based on the signal corresponding to the difference; and
reducing a low-frequency band signal of the input audio signal in the detected wind noise section by separating the at least one low-frequency band signal and the remaining frequency band of the input audio signal, multiplying the at least one low-frequency band signal by the gain, and merging the at least one low-frequency band signal with the remaining frequency band of the input audio signal.

24. A non-transitory computer readable medium having executable codes to perform an audio data processing method, the method comprising:
calculating a differential value corresponding to a difference between a left channel input audio signal and a right channel input audio signal;
adjusting a level of a low-frequency band signal of the left channel input audio signal and a level of a low-frequency band signal of the right channel input audio signal according to the calculated differential value;
adding a high-frequency band signal of the left channel input audio signal to the adjusted low-frequency band signal of the left channel input audio signal; and
adding a high-frequency band signal of the right channel input audio signal to the adjusted low-frequency band signal of the right channel input audio signal.

* * * * *